(12) United States Patent
Lim

(10) Patent No.: US 7,017,538 B2
(45) Date of Patent: Mar. 28, 2006

(54) METHOD OF PRODUCING A POWERFUL AND EFFICIENT INTERNAL COMBUSTION FOUR STROKE ENGINE USING A BLOWER AND A SINGLE VALVE CYLINDER

(76) Inventor: Yeap Liang Lim, 353, Mukim 12, Jalan Tengah, Sungai Ara, Penang (MY) 11900

(*) Notice: Subject to any disclaimer, the term of this patent is extended or adjusted under 35 U.S.C. 154(b) by 25 days.

(21) Appl. No.: 10/848,688

(22) Filed: May 17, 2004

(65) Prior Publication Data

US 2004/0261734 A1   Dec. 30, 2004

(30) Foreign Application Priority Data

May 27, 2003   (MY) .............................. PI2003 1944

(51) Int. Cl.
*F01L 1/28* (2006.01)
(52) U.S. Cl. ................ 123/79 R; 123/79 A; 123/80 C; 123/190.1; 123/188.1; 123/188.14; 123/188.17
(58) Field of Classification Search ............. 123/79 R, 123/79 A, 80 C, 190.1, 188.1, 188.14, 188.17
See application file for complete search history.

(56) References Cited

U.S. PATENT DOCUMENTS

| 4,487,171 A | * | 12/1984 | Vosper | ...................... 123/79 R |
| 6,295,961 B1 | * | 10/2001 | Carter | ...................... 123/190.1 |

* cited by examiner

*Primary Examiner*—Tony M. Argenbright
*Assistant Examiner*—Johnny H. Hoang
(74) *Attorney, Agent, or Firm*—Merchant & Gould P.C.

(57) ABSTRACT

The present invention relates generally to a method for providing an efficient and powerful engine for internal combustion four stroke engines using a single valve per cylinder as the intake and exhaust valve. Outside air emerging from an air filter is forcibly pumped into the engine head using a blower which then is drawn into the combustion chamber during the intake stroke. The timing for opening and closure of the single valve is controlled by the camshaft which is provided with a cam lobe profile capable of prolonging the valve timing thus enabling the valve to remain open for a longer duration to cater for evacuation of air in the exhaust stroke and the intake of air in the intake stroke thereby permitting the use of only one single valve per cylinder.

13 Claims, 8 Drawing Sheets

FIG. 1-A
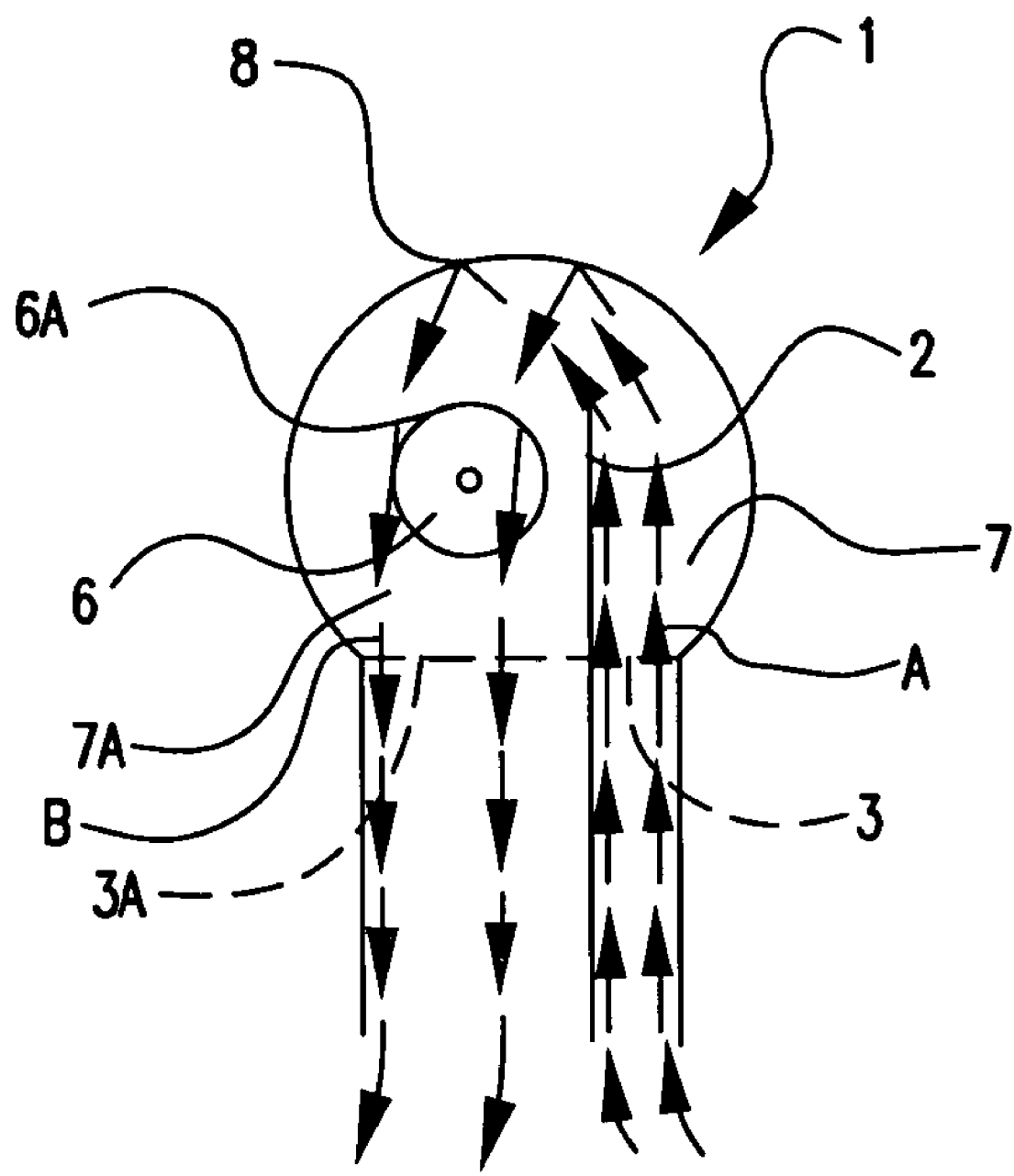

FIG. 2-A
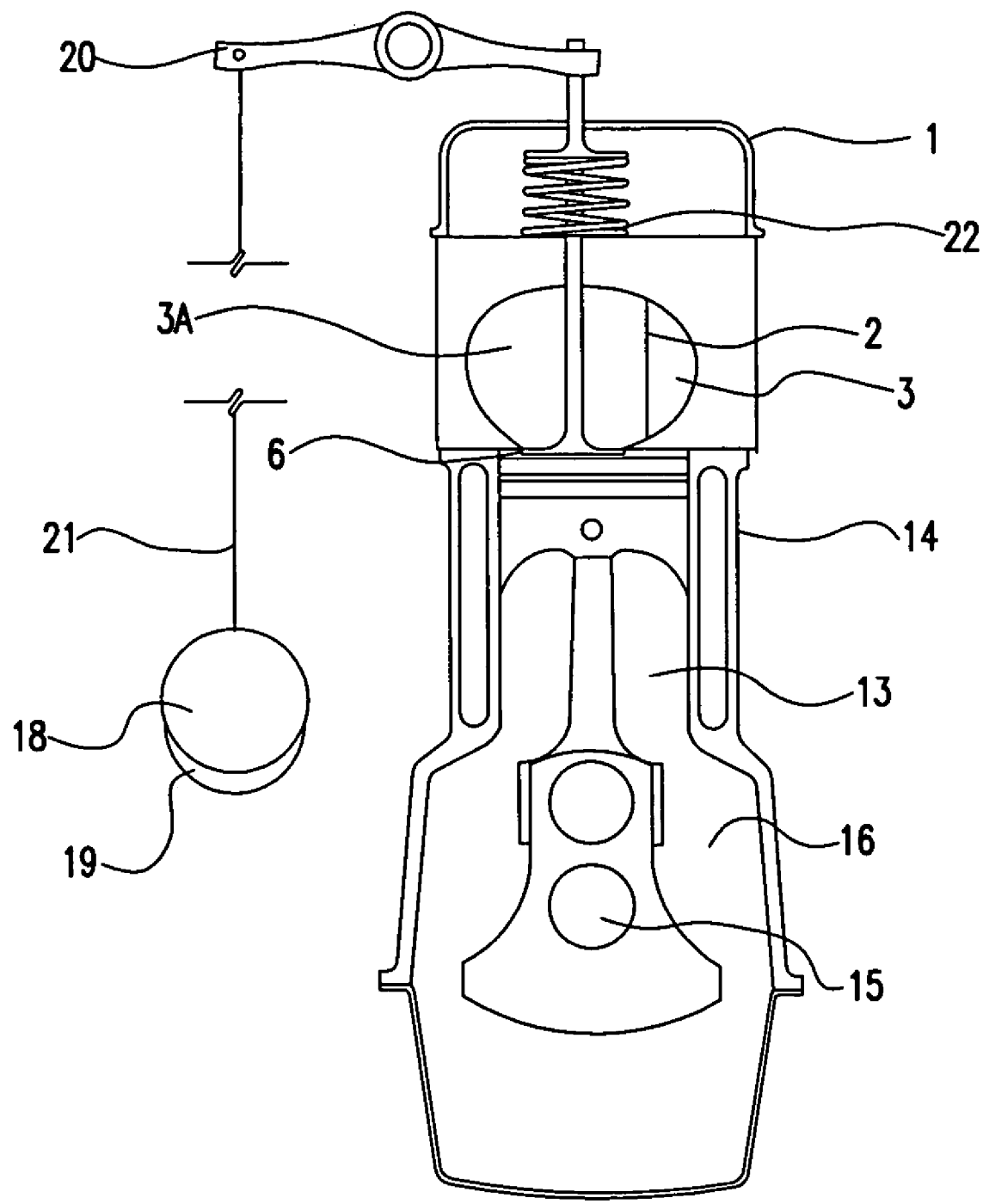

FIG. 3-A
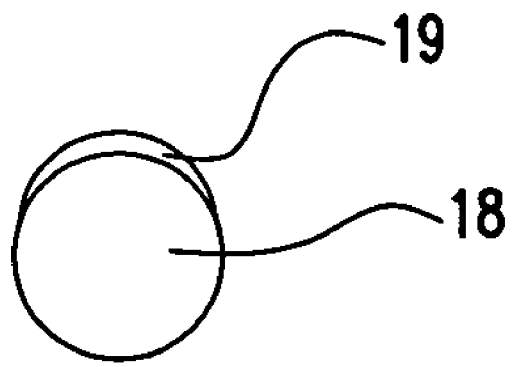

FIG. 4-A
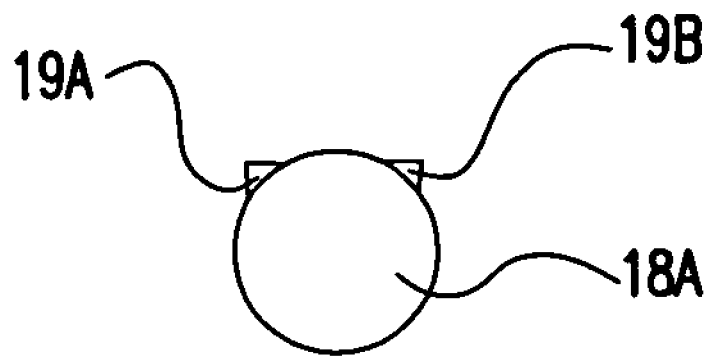

METHOD OF PRODUCING A POWERFUL AND EFFICIENT INTERNAL COMBUSTION FOUR STROKE ENGINE USING A BLOWER AND A SINGLE VALVE CYLINDER

TECHNICAL FIELD OF THE INVENTION

The present invention relates generally to a method for providing an efficient and powerful engine for internal combustion four stroke engines using a single valve per cylinder as the intake and exhaust valve. Outside air emerging from an air filter is forcibly pumped into the engine head using a blower which is then drawn into the combustion chamber during the intake stroke. The timing for opening and closure of the single valve is controlled by the camshaft which is provided with a cam lobe profile capable of prolonging the valve timing thus enabling the valve to remain open for a longer duration to cater for evacuation of air in the exhaust stroke and the intake of air in the intake stroke thereby permitting the use of only one single valve per cylinder.

BACKGROUND OF THE INVENTION

Conventional models of internal combustion engines have at least one intake valve and at least one exhaust valve. The intake and exhaust valves open at the appropriate time (that is during intake and exhaust stroke) to let in air and let out exhaust gas respectively. Both the valves are closed during compression and combustion so that the combustion chamber is sealed.

Air resistance can decrease the power from engine as the piston moves down in the intake stroke. It can be lessened substantially by having two intake valves in each cylinder. Similarly air resistance also makes it hard for exhaust gas to exit a cylinder thereby again robbing the engine of power. To overcome this prior arts have included an additional exhaust valve to each cylinder thus creating four valves per cylinder engines—two intake and two exhaust valves which will improve the engine performance. By having two intake valves per cylinder, air can be drawn into the combustion chamber at a faster rate and therefore more air will fill the combustion chamber before the intake valve closes for the next stroke. The high content of air present in the combustion chamber will cause better compression and hence a more efficient combustion. By having two exhaust valves per cylinder the exhaust gas will be able to exit the combustion chamber at a faster rate. To further increase performance some engines have three intake valves and two exhaust valves making it into five valves per cylinder. Although this increases the performance of the engine, it accordingly increases manufacturing costs and as more valves are employed the number of moving parts required to transmit the reciprocating motion of the cam follower or rods to the valves are also accordingly increased thus making the assembly complex and bulky besides increasing maintenance costs due to wear and tear of the moving parts. Further due to friction of the moving parts, heat is generated which in turn additionally heats up the engine head which is undesirable. The manufacturing costs will also increase substantially as more components are used and are required to be assembled.

Valve operating mechanisms used in internal combustion engines are generally designed to meet requirements for operations of the engines. The valve diameter and the valve lifter are selected to efficiently introduce as much air as possible into the combustion chamber in order to produce maximum engine power upon ignition. Since the valve of conventional models opens and closes within split second, the setback is that before air intake could reach its optimum level, the intake valve will close and no further air is allowed into the combustion chamber even if the combustion chamber is not totally full. Therefore the combustion efficiency is reduced and fuel economy is affected.

The present invention overcomes, or at least partly alleviates the above shortcomings by providing a method for producing a more powerful and efficient internal combustion for four stroke engines whilst capable of reducing heat build up in the engine head that results from routine internal combustion.

SUMMARY OF THE INVENTION

Accordingly, it is the primary aim of the present invention to provide a method for producing a powerful and efficient four stroke engine by using simple parts namely a blower, a divider and a single valve per cylinder;

It is yet another object of the present invention to provide a method for producing a powerful and efficient four stroke engine whereby the valve is capable of being opened for a longer duration that is at least the total duration of the opening and closing of two valves (an intake and an outlet valve) of a conventional two valve per cylinder engine thereby allowing use of only a single common valve per cylinder for inlet and exit of air and exhaust respectively which in turn minimises the number of components to be used and actuated thus reducing manufacturing costs;

It is yet another object of the present invention to provide a method for producing a powerful and efficient four stroke engine wherein the valve only opens and closes only once during the complete cycle of the four stroke engine thereby reducing wear and tear of components and heat generated due to friction;

It is yet another object of the present invention to provide a method for producing a powerful and efficient four stroke engine whereby the valve timing is prolonged longer than conventional models;

It is yet another object of the present invention to provide a method for producing a powerful and efficient four stroke engine wherein usage of a single valve per cylinder reduces the number of related moving parts required to transmit the reciprocating motion of the cam follower or rods to the valves;

It is yet another object of the present invention to provide a method for producing a powerful and efficient four stroke engine which reduces the weight of reciprocating parts thus allowing the engine to reach higher revolutions per minute (r.p.m.);

It is yet another object of the present invention to provide a method for producing a powerful and efficient four stroke engine wherein only one single common valve is used as the intake and exhaust valve;

It is yet another object of the present invention to provide a method for producing a powerful and efficient four stroke engine which is capable of reducing heat build up in the engine head resulting from routine internal combustion as outside air is continuously being forcibly pumped into the engine head by the blower;

It is yet another object of the present invention to provide a method for producing a powerful and efficient four stroke engine which uses a relatively cheap ordinary blower to pump in as much air as possible into the engine head thereby creating a reservoir of high pressured air ready to be effortlessly drawn into the combustion chamber during the short duration of the intake stroke;

It is yet another object of the present invention to provide a method for producing a powerful and efficient four stroke engine wherein the blower can be operated using electricity or a belt;

It is yet another object of the present invention to provide a method for producing a powerful and efficient four stroke engine whereby the blower will forcibly pump the comparatively weakened and sluggish air [after passing through the air filter] into the engine head so that maximum intake of air into the combustion chamber through the opened valve can be achieved during the relatively short duration of the intake stroke;

It is yet another object of the present invention to provide a method for producing a powerful and efficient four stroke engine whereby efficiency and power of the engine can be increased by increasing the speed of the blower;

It is yet another object of the present invention to provide a method for producing a powerful and efficient four stroke engine which can be utilized in high speed engines;

It is yet another object of the present invention to provide a method for producing a powerful and efficient four stroke engine wherein the engine can be operated using cylinder stored air when there is no atmospheric air or the air pressure is very low;

It is yet another object of the present invention to provide a method for a producing a powerful and efficient four stroke engine wherein only one cam lobe of uniform height is provided to the cam shaft for opening and closing the valve thereby reducing the time of manufacturing compared to the time required to manufacture conventional camshafts where more than one cam lobe per shaft is required to operate the opening and closure of multiple valves of the cylinder;

It is yet another object of the present invention to provide a method for producing a powerful and efficient four stroke engine which is simple in structure, easy and cheap to manufacture.

These and other objects of the principles of the present invention are achieved by, a method for a producing a powerful and efficient internal combustion four stroke engine comprising;

mounting a divider (2) vertically into the engine head (1) to divide the engine head (1) to such an extent as to form a U-shaped like passage with an opening for entry (3) of air and an opening for exit (3A) of air and exhaust gas;

using a blower to continuously pump air into the engine head (1) through the opening (3) located on the engine head (1);

causing the incoming air (Arrow A) from the opening (3) to pause a very short duration upon hitting the bend (8) opposite the openings (3) and (3A) before being deflected thus causing air to U-turn and travel out (Arrow B) towards the opening (3A) thereby instantaneously carrying away any exhaust gas evacuated from the combustion chamber (16);

using a single valve (6) for the intake of air into and exit of exhaust gas from the combustion chamber (16) of the cylinder (14).

BRIEF DESCRIPTION OF THE DRAWINGS

Other aspect of the present invention and their advantages will be discerned after studying the Detailed Description in conjunction with the accompanying drawings represented in a simplified form in which:

FIG. 1-A is a plan view of the engine head showing the flow of air and its deflection upon hitting the bend of the engine head opposite the openings for entry and exit of air;

FIG. 2-A is a longitudinal cross-sectional view of the engine head and cylinder when the valve is closed and the relative position of the cam lobe;

FIG. 3-A is a view at line A—A of FIG. 3.

FIG. 4-A is a view at line B—B of FIG. 4.

DETAILED DESCRIPTION OF THE DRAWINGS

The invention will be more clearly understood from the following description of the embodiments thereof, given by way of example only with reference to the accompanying drawings.

Figure 1:
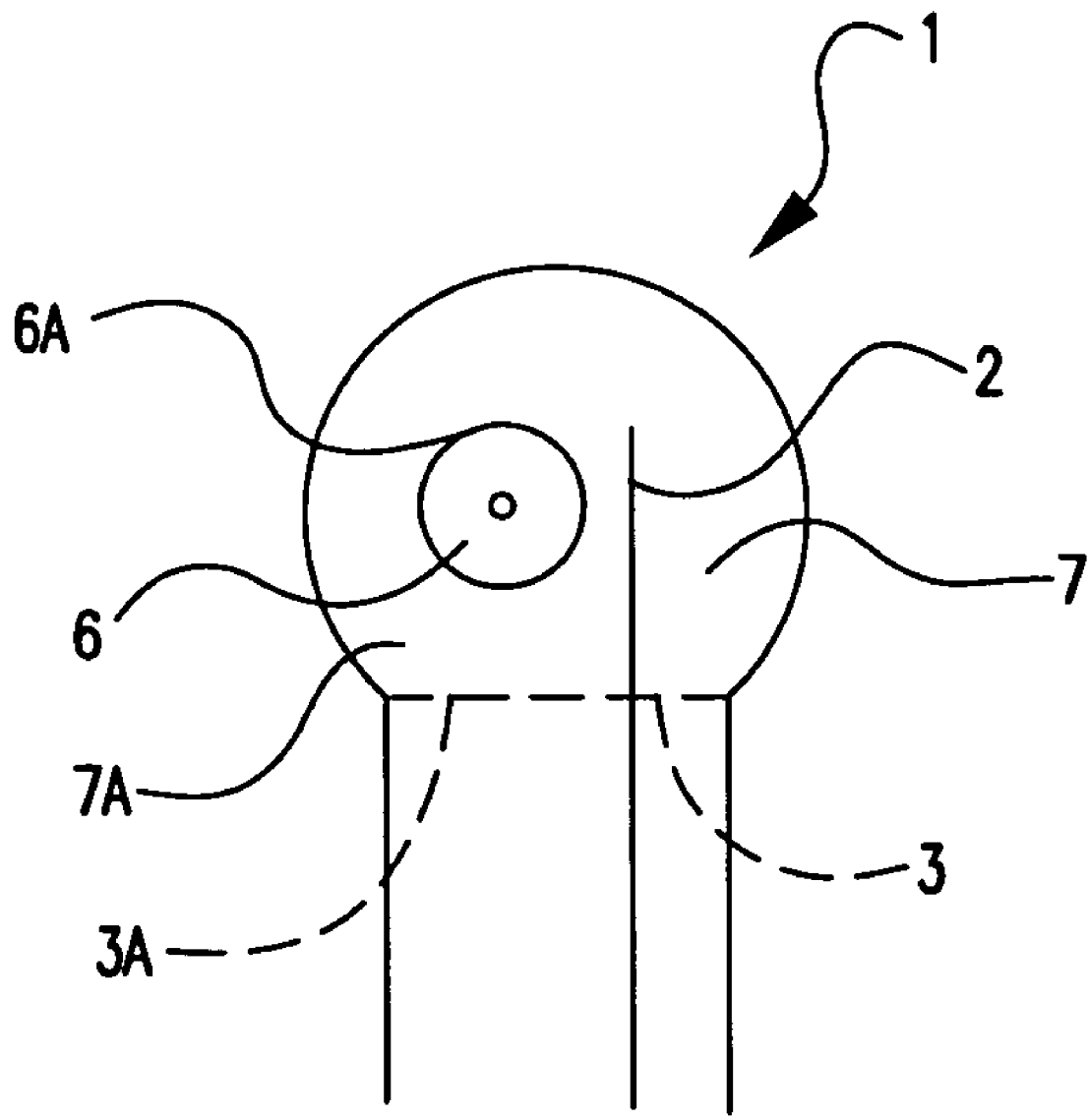
FIG. 1 is a plan view of the engine head showing the U-shaped passage of unequal width for air to flow in from the narrow entrance and air and evacuated exhaust gas to flow out from the broader entrance.

Referring to FIG.1, a plan view of the engine head (1) which forms a portion of an internal combustion engine with which the invention is utilized. The engine head (1) is depicted apart from the remaining components of the engine since the invention deals primarily with a single valve per cylinder and air flow associated within the partitioned engine head (1). A divider (2) divides the engine head (1) vertically to such an extent as to form a U-shaped like passage of unequal width (7), (7A); the entrance (3) of the narrower passage (7) is connected to the blower [not shown] which pumps in air into the engine head (1) and the exit opening (3A) of the wider passage (7A) is connected to the exhaust pipe [not shown] to expel air and exhaust gas. The wider exit opening (3A) is to ensure that exhaust gas is expelled to the exhaust pipe as quickly as possible to ensure that spent air do not get drawn into the combustion chamber (16) during the intake stroke which will decrease efficiency of the engine.

The valve (6) is located at the wider passage (7A). For optimum power and high efficiency the extent of insertion of the divider (2) into the engine head (1) vertically from one side of the engine head (1) where the openings (3) and (3A) are located is preferably at least up to the furthest peripheral point (6A) of the valve (6) from the opening (3A). However it is to be understood that if the divider (2) is not positioned as described above this invention is still workable, the only problem is that the flow of air that is deflected from the bend (8) is weaker.

As in all prior arts, air from outside which is drawn in for purposes of combustion has to first pass through an air filter (not shown) to filter away unwanted substances and by this process the air emerging from the filter is considerably weakened. The air pressure is considerably reduced. During the intake stroke there is a need to draw in as much of the sluggish filtered air as possible into the combustion chamber (16). Due to the reduced air pressure the filtered air may not be able to fill the combustion chamber (16) up to its optimum capacity quickly enough before the intake valve closes which is crucial in producing a powerful and efficient engine. Hence the use of multiple valves for increased efficiency is utilized in prior arts. In the present invention, however, a single valve per cylinder is sufficient to produce at least the same or even more power and efficiency than conventional engines as the weakened air emerging from the filter is given the boost by the blower which forcibly pumps the filtered air into the engine head (1) thereby creating a reservoir of high pressured air ready to be drawn in effortlessly into the combustion chamber (16) during the intake stroke. By using this method, the filtered air is efficiently filled into the combustion chamber (16) up to its optimum capacity before the valve closes for the next stroke and hence permitting opportunity for high compression to produce a powerful engine thereby reducing fuel consumption and saving cost.

Referring to FIG. 1-A, a plan view of the engine head (1) showing the flow of air within it. When in operation, the blower will forcibly pump the filtered air into the engine head (1) through the narrow opening (3) and the air will travel along the narrow passage (7) of the partitioned engine head (1) in the direction depicted by Arrow A until it hits the bend (8) opposite the openings (3) (3A). Upon hitting the bend (8), it will pause for only a very short duration before being deflected thus deviating the air flow causing it to U-turn and travel outward through the wide opening (3A) into the exhaust pipe in the direction depicted by Arrow B. It is to be noted that the function of the blower in this present invention is vital in three aspects firstly to continuously forcefully pump air into the engine head (1) regardless of the different strokes of the engine cycle in order to provide a reservoir of high pressured air for optimum intake of air into the combustion chamber (16), secondly to instantaneously carry away any spent air evacuated from the combustion chamber (16) so that it does not back flow or get drawn into the combustion chamber (16) again and thirdly to reduce heat build up in engine head (1) thus enabling the engine to perform at optimum power and with the highest efficiency.

Figure 2:
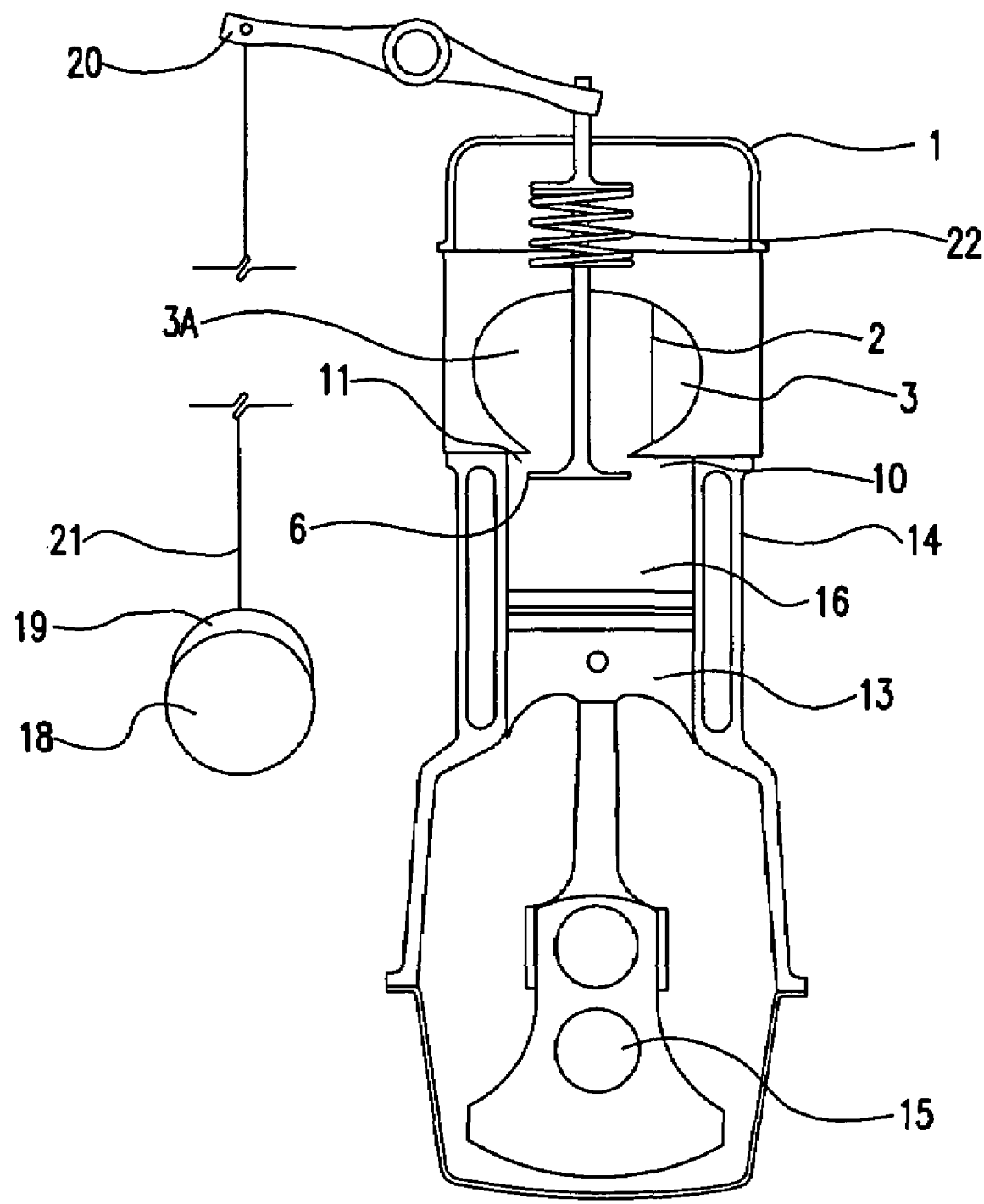
FIG. 2 is a longitudinal cross-sectional view of the engine head and cylinder when the valve is opened and the relative position of the cam lobe.

Referring to FIG. 2, a longitudinal cross-sectional view of the engine head (1) and cylinder (14) at the centre during the intake stroke. As the piston (13) in the cylinder (14) starts to move down in the intake stroke thereby creating a vacuum, the valve (6) opens and air will be effortlessly drawn into the combustion chamber (16), from the reservoir of high pressured air readily available in the engine head (1) [as air is continuously pumped in by the blower] through the gaps of the opened valve (6) to fill up the combustion chamber (16) to optimum capacity. During the compression stroke, the valve (6) closes trapping the air in the cylinder (14). Even when the valve (6) is closed air is continuously pumped in by the blower to the engine head (1) to cool down the engine head (1) thereby reducing heat build up in the engine head (1) preventing overheating and enabling efficient performance.

The piston (13) then moves up and compresses the trapped air that was brought in by the intake stroke as illustrated in FIG. 2-A. This is the compression stroke. As in conventional models, a fuel injector (10) to inject fuel into the compressed air is employed. For diesel powered engines when the fuel injector injects fuel into the combustion chamber (16) containing air of high compression combustion occurs instantaneously. For petrol powered engines, after the petrol is injected into the combustion chamber a spark plug (11) has to be used to ignite the air-petrol mixture. The combustion process produces a powerful explosion which pushes the piston (13) down the cylinder (14) with substantial force turning the crankshaft (15) to provide the power to propel the loading.

With the piston (13) at the bottom of the cylinder (14), the valve (6) opens to allow burnt exhaust gas to be expelled to the exhaust pipe. The piston (13) then travels to the top of the cylinder (14) evacuating the exhaust gas. The exhaust will be expelled from the cylinder (14) via the opened valve (6) and once out of the combustion chamber (16) it is instantaneously carried away by the outward bound air [indicated by Arrow B in FIG. 1-A] through the broad opening (3A) into the exhaust pipe to be expelled. Due to the direction of the outward bound air (Arrow B) the exhaust gas has no opportunity to backflow towards the bend (8) as it is instantly carried away by the fast moving outward bound air (Arrow B) towards the opening (3A).

Figure 3:
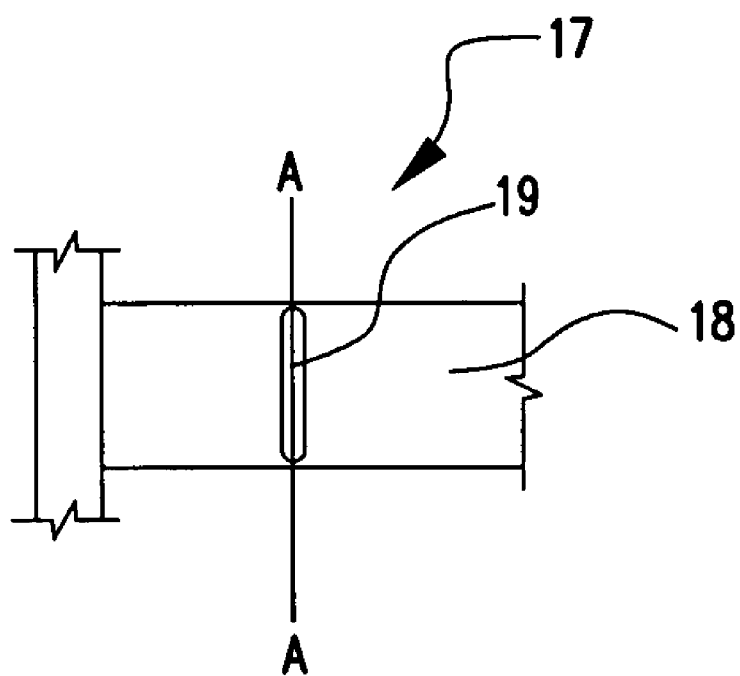
FIG. 3 shows the camshaft profile of the present invention which is provided with a single cam lobe which is a raised curved surface on one side of the shaft.

In conventional models there is at least one intake valve and one exhaust valve per cylinder. The exhaust valve of conventional models will open at the start of the exhaust stroke and close once the exhaust stroke is completed and simultaneously at the end of the exhaust stroke the intake valve will open to let in air and closes once the intake stroke is completed. The frequency of the opening and closing of the valves and the related actuating parts will generate heat and also cause wear and tear due to friction thus increasing manufacturing and maintenance cost. Hence there is a need to overcome the above shortcomings whilst not having to compromise with reduced power or efficiency of the engines. This is accomplished by having a single valve (6) of the present invention which is used as the common valve for intake and exhaust of air. The common valve (6) of the present invention will remain open even after the end of the exhaust stroke to allow intake of air for the next stroke that is the intake stroke. Therefore the valve (6) is kept opened from the start of the exhaust stroke right up to the intake stroke. By using only one single common valve per cylinder the number of components and moving parts are reduced thereby minimizing wear and tear and heat generated due to friction from the moving parts In order for the valve (6) to remain open for a longer duration to cater for intake of air and exhaust of gas, the valve timing has to be prolonged longer than the conventional models which uses at least two valves per cylinder. This is accomplished by a valve timing mechanism as illustrated in FIG. 3, comprising a camshaft (17) which is a rotating shaft (18) provided with a cam lobe (19). The cam lobe (19) is a raised curved surface of uniform height on one side of the shaft (18) that pushes against a valve lifter (20) via a cam rod (21) and a series of actuating parts and linkages (not shown in detail) moving the valve lifter (20) up and down. When the cam lobe (19) pushes against the cam rod (21), the valve lifter (20) accordingly moves up and in turn pushes the valve (6) open. The uniform height of the raised curved surface of the cam lobe (19) ensures that the valve (6) stays opened in the same position without wavering until the cam lobe (19) rotates away. When the cam lobe (19) rotates away from the cam rod (21) the valve lifter (20) returns to its original position and the valve (6) is closed by a spring (22) that is attached to the valve (6). The valve lifter (20) is connected to the valve (6) through a series of linkages (not shown in detail). The camshaft (17) must be synchronized with the crankshaft (15) so that the camshaft (17) makes one revolution for every two revolutions of the crankshaft (15).

Figure 4:
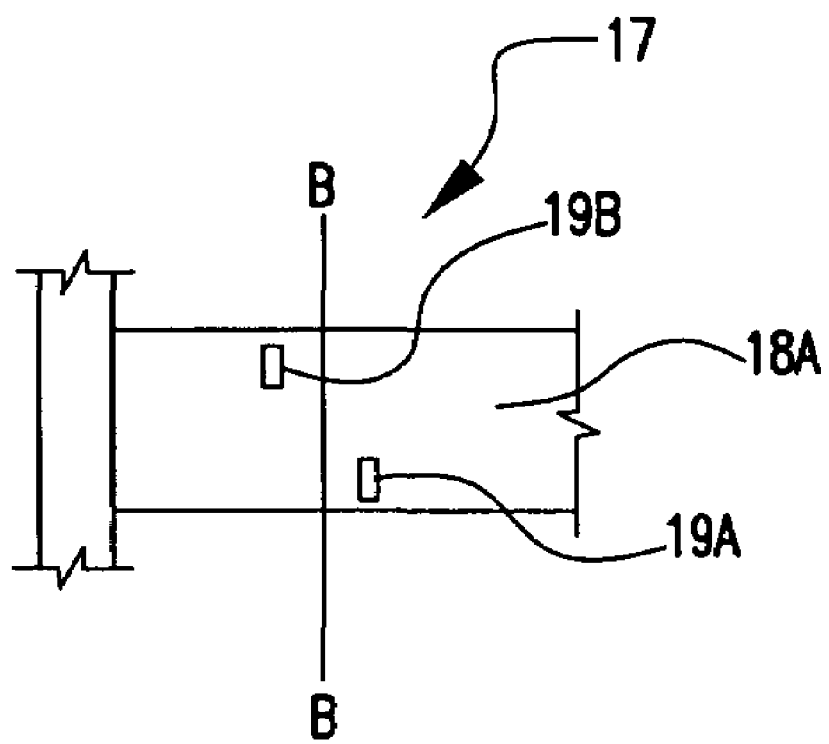
FIG. 4 shows the camshaft profile of the conventional model which is provided with two cam lobes which are angled protrusions on predetermined sides of the shaft.

Referring to FIG. 3-A, a view at line A—A of FIG. 3 which illustrates the cam lobe (19) of the present invention. The cam lobe (19) has a raised curved surface of uniform height on one side of the shaft (18). In contrast the camshaft (17A) of conventional models illustrated in FIGS. 4 and 4-A, is provided with cam lobes (19A) (19B) having two angled protrusion located at predetermined parts of the rotating shaft (18A) to control the opening and closure of the intake and exhaust valve respectively. The length of the cam lobe (19) of the present invention is at least the distance between the first angled protrusion (19A) to the second angled protrusion (19B) of conventional models joined together to form a raised curved surface illustrated in FIG. 3-A. This allows the valve timing to be prolonged to the extent that the valve (6) can be kept opened for a longer duration that is at least the duration of the opening and closing of two valves in a two valve per cylinder engine. With this type of cam lobe profile, the valve (6) only opens and closes once during the complete cycle of four stroke engine thereby reducing wear and tear due to friction and minimizing heat to the engine head (1). The manufacturing cost and time is also reduced as only one cam lobe (19) is required to be provided on the shaft (18).

The present invention is also capable of being utilized in high speed engines such as aeroplanes and can also be modified to allow for production of a more powerful engine for usage in bigger vehicles, ships, trains and bigger machines by employing a larger valve or a larger blower or by increasing the speed of the blower or adjusting the position of the divider (2) over the peripheral point (6A). However it is to be understood that the principles of this invention remains the same. For machines requiring constant speed a blower operated using electricity can be employed and the speed of the machine can be adjusted according to needs whilst for vehicles wherein the speed of the engine is not constant, the blower can be operated using a belt.

Unlike conventional models where the only source of air for the combustion process is outside air, the air supplied for purposes of combustion in this present invention can either be outside air or cylinder stored air. This is very useful for aeroplanes which travel thousands of metres above sea level where air pressure is too low to allow for effective internal combustion. The present invention is capable of overcoming the abovesaid shortcoming as the invention can still work effectively by using air stored in cylinders for purposes of internal combustion.

Whilst the divider (2) has been described and illustrated in some detail in the above as being straight, it will be appreciated that this configuration, shape, size, arrangement or design is not necessarily the only configuration, shape, size, arrangement or design that can be used. For example it is possible to have a curved divider or other configurations, shapes, sizes, arrangements or designs can be practiced, however, what is advantageous in accordance with the present invention is the fact that the divider (2) is capable of dividing the engine head (1) to the extent that the engine head (1) becomes a U-shaped passage with one opening for entry of air narrower than the other for exit of air.

It will be understood by those skilled in the art that changes and modifications may be made to the invention without departing from the spirit and scope of the invention. Therefore it is intended that the foregoing description is merely for illustrative purposes and not intended to limit the spirit and scope of the invention in any way but only by the spirit and scope of the appended claim.

What is claimed is:

1. A method for producing a powerful and efficient internal combustion four stroke engine comprising:
    mounting a divider (2) vertically into the engine head (1) to divide the engine head (1) to form a U-shaped like passage with an opening for entry (3) of air and an opening for exit (3A) of air and exhaust gas;
    using a blower to continuously pump air into the engine head (1) through the opening (3) located on the engine head (1);
    causing the incoming air (Arrow A) join the opening (3) to pause a very short duration upon hitting a bend (8) opposite the openings (3) and (3A) before being deflected thus causing air to U-turn and travel out (Arrow B) towards the other opening (3A) thereby instantaneously carrying away any exhaust gas evacuated from the combustion chamber (16); and
    using a single valve (6) for the intake of air into and exit of exhaust gas from the combustion chamber (16) of the cylinder (14).

2. A method for producing a powerful and efficient internal combustion four stroke engine as in claim 1 further comprising using a divider (2) to vertically divide the engine head (1) to form a U-shaped like passage of unequal width (7) and (7A).

3. A method for producing a powerful and efficient internal combustion four stroke engine as in claim 1 further comprising mounting and inserting the divider (2) into the engine head (1) from the side where the openings (3) and (3A) are located to a distance which is at least up to the furthest peripheral point (6A) of said valve (6).

4. A method for producing a powerful and efficient internal combustion four stroke engine as in claim 1 further comprising having the ratio for the narrower opening (3) for entry of air and the wider opening (3A) for exit of air ranging between 1:6 and 3:4.

5. A method for producing a powerful and efficient internal combustion four stoke engine as in claim 1 further comprising maintaining a continuous flow of air from the opening (3) to the opening (3A) in the engine head (1).

6. A method for producing a powerful and efficient internal combustion four stroke engine as in claim 1 further comprising using only a single valve per cylinder for inlet and exit of air.

7. A method for producing a powerful and efficient internal combustion four stroke engine as in claim 1 further comprising opening of the valve (6) for a duration at least equivalent to the total duration of the opening and closing of the two valves of a two valve per cylinder engine.

8. A method for producing a powerful and efficient internal combustion four stroke engine as in claim 1 further comprising providing the camshaft (18) with a cam lobe (19) which is a raised curved surface capable of prolonging the valve timing.

9. A method for producing a powerful and efficient internal combustion four stroke engine as in claim 8 wherein the raised curved surface is of uniform height.

10. A method for producing a powerful and efficient internal combustion four stroke engine as in claim 1 further comprising instantaneously carrying away evacuated exhaust gas out through the opening (3A).

11. A method for producing a powerful and efficient internal combustion four stroke engine as in claim 1 further comprising the capability of varying the engine power and efficiency by adjusting the length of the divider (2) which is inserted in the engine head (1).

12. A method for producing a powerful and efficient internal combustion four stroke engine as in claim 1 further comprising functioning efficiently on cylinder stored air when there is no atmospheric air.

13. A method for producing a powerful and efficient internal combustion four stroke engine as in claim 1 further comprising being effectively utilized in high speed engines.

\* \* \* \* \*